US012560958B2

(12) United States Patent
Sima

(10) Patent No.: US 12,560,958 B2
(45) Date of Patent: Feb. 24, 2026

(54) CLOCK DISTRIBUTION NETWORK

(71) Applicant: EM Microelectronic-Marin SA, Marin (CH)

(72) Inventor: Ovidiu Sima, Zurich (CH)

(73) Assignee: EM Microelectronic-Marin SA, Marin (CH)

( * ) Notice: Subject to any disclaimer, the term of this patent is extended or adjusted under 35 U.S.C. 154(b) by 191 days.

(21) Appl. No.: 18/474,740

(22) Filed: Sep. 26, 2023

(65) Prior Publication Data

US 2024/0126321 A1    Apr. 18, 2024

(30) Foreign Application Priority Data

Oct. 14, 2022    (EP) ...................................... 22201654

(51) Int. Cl.
*G06F 1/08*        (2006.01)
*G06F 1/10*        (2006.01)

(52) U.S. Cl.
CPC . *G06F 1/10* (2013.01); *G06F 1/08* (2013.01)

(58) Field of Classification Search
CPC ............. G06F 1/10; G06F 1/08; G06F 1/3237
See application file for complete search history.

(56) References Cited

U.S. PATENT DOCUMENTS

| | | | | | |
|---|---|---|---|---|---|
| 5,579,353 A | * | 11/1996 | Parmenter | ............. | H04L 7/0083 |
| | | | | | 331/DIG. 2 |
| 5,758,132 A | * | 5/1998 | Stråhlin | .................... | G06F 1/08 |
| | | | | | 714/11 |

| | | | | | |
|---|---|---|---|---|---|
| 6,021,501 A | * | 2/2000 | Shay | ......................... | G06F 1/04 |
| | | | | | 331/18 |
| 6,237,105 B1 | * | 5/2001 | Walsh | ....................... | G06F 1/04 |
| | | | | | 713/601 |
| 6,587,954 B1 | * | 7/2003 | Chiu | ........................ | G06F 1/08 |
| | | | | | 713/400 |
| 7,134,036 B1 | * | 11/2006 | Guan | ........................ | H03L 7/16 |
| | | | | | 713/600 |
| 10,284,185 B1 | * | 5/2019 | Gaide | .................. | H03K 19/096 |
| 2002/0060595 A1 | | 5/2002 | Nakano | | |
| 2004/0189366 A1 | | 9/2004 | Haringer et al. | | |
| 2005/0066067 A1 | | 3/2005 | Suh | | |
| 2008/0183924 A1 | * | 7/2008 | Vergnes | .................... | G06F 1/10 |
| | | | | | 710/100 |

(Continued)

FOREIGN PATENT DOCUMENTS

| | | | | | |
|---|---|---|---|---|---|
| CN | 106774799 A | * | 5/2017 | .......... | G06F 1/3234 |
| JP | 2005-78573 A | | 3/2005 | | |

(Continued)

OTHER PUBLICATIONS

European Search Report for EP 22 20 1654 dated Mar. 31, 2023.

*Primary Examiner* — Jaweed A Abbaszadeh
*Assistant Examiner* — Cheri L Harrington
(74) *Attorney, Agent, or Firm* — Sughrue Mion, PLLC

(57)        ABSTRACT

A clock distribution network (10) including a clock generator (14) configured to generate at least a processor clock signal and at least a first peripheral clock signal, the clock generator including a processor clock output (31), a first peripheral clock output (32) and a first clock request input (42). A first peripheral unit (22) via a first clock request input (42) is operable to trigger the clock generator (14) to transmit the first peripheral clock signal via the first peripheral clock output (32).

10 Claims, 10 Drawing Sheets

(56) References Cited

U.S. PATENT DOCUMENTS

| | | | |
|---|---|---|---|
| 2010/0229011 A1* | 9/2010 | Pedersen | G06F 1/3237 713/322 |
| 2011/0214003 A1* | 9/2011 | Nara | G06F 1/08 713/400 |
| 2012/0139590 A1* | 6/2012 | Myers | G06F 1/3237 327/113 |
| 2015/0067363 A1* | 3/2015 | Jouin | G06F 1/06 713/320 |
| 2021/0157388 A1* | 5/2021 | Kulandaivel | G06F 1/08 |

FOREIGN PATENT DOCUMENTS

| | | |
|---|---|---|
| JP | 2021-179798 A | 11/2021 |
| KR | 10-2005-0029104 A | 3/2005 |

* cited by examiner

Clk_16_MHz

Clk_8_MHz

Clk_4_MHz

Clk_2_MHz

Clk_1_MHz

Clk_8_MHz

Clk_CPU_8_MHz

Clk_8_MHz

Start_Perif

Req_Clock_Perif

Clk_Perif_8_MHz t1 t2

S3  S4  S5  S6  S1  S2

Clk_16_MHz

Clk_8_MHz

Clk_4_MHz

Clk_2_MHz

Clk_1_MHz

Clk_1_MHz

Clk_CPU_1_MHz

Clk_8_MHz

Start_Perif

Req_Clock_Perif

Clk_Perif_8_MHz t1 t2

S3  S4  S5  S6  S1  S2

Clk_16_MHz
Clk_8_MHz
Clk_4_MHz
Clk_2_MHz
Clk_1_MHz
Clk_1_MHz
Clk_CPU_1_MHz
Clk_8_MHz
Clk_8_MHz_Inv
Start_Perif
Req_Clock_Perif
Clk_Perif_8_MHz t1 t2

S3' S3 S4 S5 S6 S1 S2

CLOCK DISTRIBUTION NETWORK

CROSS REFERENCE TO RELATED APPLICATIONS

The present application is based on, and claims priority from the prior European Patent Application No. 22201654.5, filed on Oct. 14, 2022, the entire contents of which are incorporated herein by reference.

FIELD OF THE INVENTION

The present invention relates to a clock distribution network and to a method of distributing a clock signal in a clock distribution network.

BACKGROUND OF THE INVENTION

Typically, in digital processing systems there is provided a frequency generation unit, such as a clock source that provides a master clock signal. The master clock signal is typically provided to clock dividers or clock generators that provide clock signals at different frequencies to peripheral units of a digital processing system.

In order to exchange data between a processing unit with individual or peripheral units or in order to exchange data between peripheral units of a digital processing system it is required that the data exchanging units are part of a common clock tree, e.g. of a global clock tree. For the implementation of a global clock tree, it is generally required to provide a number of buffers and inverters. Here, all flip-flops in such a global clock tree are required to toggle at the same time. This implies a comparatively high static and dynamic power consumption. In addition, since all the logic being part of the same clock tree a power consumption is also comparatively high, thus leading to a reduced battery lifetime of a mobile electronic device.

SUMMARY OF THE INVENTION

It is therefore an object of the present invention to provide a clock distribution network and a method of distributing a clock signal in a digital processing system that has a reduced power consumption and which enables an extended battery lifetime, especially for mobile electronic devices equipped with such a clock distribution network.

In one aspect the present disclosure relates to a clock distribution network. The clock distribution network comprises a clock generator configured to generate at least a processor clock signal and at least a first peripheral clock signal. The clock generator further comprises at least a processor clock output, a first peripheral clock output and a first clock request input. The processing unit is connected to the processor clock output and is configured to operate on a rising edge of the processor clock signal receivable via the processor clock output. Typically, the processor clock signal is generated by the clock generator and is transmitted through the processing unit via the processor clock output.

The clock distribution network further comprises at least a first peripheral unit connected to the first peripheral clock output. The first peripheral unit is further connected to the first clock request input of the clock generator. The at least first peripheral unit is further configured to operate on a falling edge of the first peripheral clock signal received or receivable via the first peripheral clock output. Typically, a clock input of the first peripheral unit is connected to the first peripheral clock output of the clock generator.

With the clock distribution network it is further provided that the at least first peripheral unit is operable to trigger the clock generator so that the clock generator transmits the first peripheral clock signal via the first peripheral clock output. This request is typically transmitted via the first clock request input. Hence, the at least first peripheral unit is connected with the clock generator in a twofold manner. A clock input of the first peripheral unit is connected to the first peripheral clock output of the clock generator so as to receive the first peripheral clock signal from the clock generator. Furthermore, the first peripheral unit is connected separately to the first clock request input of the clock generator. In this way, the first peripheral unit is operable to transmit a clock generation request signal to the clock generator thereby prompting the clock generator to generate and/or to transmit the first peripheral clock signal via the first peripheral clock output to the at least first peripheral unit of the clock distribution network.

Since the at least first peripheral unit and the processing unit operate at different edges of their respective clock signal it can be provided that the clock distribution network does no longer require to establish and/or to provide a global clock tree. Rather, with the present clock distribution network the processing unit and the at least first peripheral unit or any further peripheral unit do no longer require to toggle at the same time and to take part in a common global clock tree in order to enable a data transmission therebetween.

Rather, and only upon demand or upon request a data transferring communication link will be established for each of the available peripheral units. In this way and since the present clock distribution network does no longer require establishing of a global clock tree static power consumption as well as dynamic power consumption of the clock distribution network can be substantially reduced thus allowing to extend the battery lifetime of a mobile electronic device being equipped with such a clock distribution network.

According to a further example the clock generator is configured to suppress a transmission of the first peripheral clock signal unless such a first peripheral clock signal is requested from the at least first peripheral unit via the first clock request input. Insofar transmission of a particular clock signal for a peripheral unit may only take place upon request of the respective peripheral unit of the clock distribution network. If a peripheral unit, e.g. the at least first peripheral unit does not request transmission of a respective clock signal via the respective clock request input of the clock generator such a peripheral clock signal will not be transmitted to the respective peripheral unit. In this way, respective clock distribution traffic and energy or power for generating and/or transmitting such peripheral clock signals can be effectively saved thereby reducing static and/or dynamic energy consumption of the clock distribution network.

According to a further example the processing unit is directly connected to the at least first peripheral unit via a first transmission line. Hence, the processing unit may be directly connected to the peripheral units of the clock distribution network separately by way of respective transmission lines. Establishing or providing of separate transmission lines provides a rather direct and unaltered communication between the processing unit and the peripheral unit or peripheral units.

According to a further example the clock distribution network comprises at least a second peripheral unit connected to a second peripheral clock output of the clock generator and connected to a second clock request input of the clock generator. The second clock request input of the at least second peripheral unit is operable to trigger the clock generator to transmit a second peripheral clock signal via the second peripheral clock output.

With some examples the clock generator comprises numerous clock outputs, each of which being connected to at least one peripheral unit. The first clock output can be connected to the first peripheral unit. The second clock output can be connected to the second peripheral unit. Typically, the clock generator is operable to generate or to derive numerous different clock signals from the master clock signal. Hence, a first peripheral clock signal to be submitted to the first peripheral unit may comprise a different frequency compared to a second peripheral clock signal to be transmitted to the second peripheral unit. The frequency of the respective first and second peripheral clock signals depends on the implementation of the respective peripheral unit.

Like the first peripheral unit also the second peripheral unit is connected to a second clock request input of the clock generator. Like the at least first peripheral unit also the at least second peripheral unit is operable to trigger the clock generator to transmit the second peripheral clock signal. A respective trigger or clock generation request signal can be submitted from the second peripheral unit via the second clock request input to the clock generator. In response and hence when receiving a respective second clock generation request signal from the at least second peripheral unit via the second clock request input, the clock generator generates and/or transmits the requested second peripheral clock signal to the at least second peripheral unit via the second clock output.

The clock distribution network is by no way limited to only a first and a second peripheral unit. The clock distribution network may be provided with a number of n peripheral units, with n being an integer number larger than 2. With some examples and for each processing unit the clock distribution network and hence the clock generator comprises a number of n separate clock outputs and a respective number of n clock request inputs connectable to a respective peripheral unit of the clock distribution network.

This way, each peripheral unit of the clock distribution network is individually connected to the clock generator and is operable to request generation and/or transmission of a respective clock signal.

According to a further example the processing unit is directly connected to the at least second peripheral unit via a second transmission line. The second transmission line may be implemented in a similar manner as described above with respect to the first transmission line. By the second transmission line the processing unit may be operable to directly communicate and/or to directly exchange data with the second peripheral unit.

The processing unit may not be limited to directly communicate only with a first and a second peripheral unit. When the clock distribution network is provided with a comparatively large number of individual peripheral units, e.g. with a number of n peripheral units the processing unit may be implemented and configured to directly communicate with each one of the peripheral units separately, i.e. via a respective transmission line. In this way it is guaranteed that the processing unit is capable to communicate, e.g. to exchange data, directly with any of the available peripheral units.

According to a further example the first peripheral unit comprises a first local clock tree. The second peripheral unit comprises a second local clock tree. The first local clock tree operates independently from the second local clock tree. Additionally or alternatively, the second local clock tree operates independently from the first local clock tree.

Since the peripheral units may operate on a falling edge of the respective peripheral clock signals received from the clock generator they may operate completely independent from each other. It is hence no longer required to provide a global clock tree, wherein a peripheral unit and/or or its digital components toggles or operate at the same time as any other peripheral unit or its digital components.

In this way, power consumption of the clock distribution network can be effectively reduced. Typically, a local clock tree of a peripheral unit is a clock tree connected with all logic components of the respective peripheral unit, and which are required to operate in a common local clock tree so as to provide the desired logic operations.

By allowing the first peripheral unit and the second peripheral unit to operate at different local clock trees it is no longer required to synchronize the clocks of the first and the second peripheral unit, respectively. In this way, any means for synchronizing the local clocks of the first and the second peripheral units are no longer required. As a consequence, respective hardware components, such as buffers, inverters or the like components typically required to synchronize the local clock trees of the first and the second peripheral unit effectively become superfluous. This may also lead to a reduction of the size of the clock distribution network.

According to a further example the clock distribution network comprises at least a delay cell connected to the processor clock output and being operable to delay the processor clock signal received by the processing unit by a predefined delay offset relative to the processor clock signal generated and transmitted by the clock generator. By way of the delay cell operation of the clock generator is delayed by a fixed and/or adjustable temporal offset. Since the processing unit is operating on a rising edge of the processor clock signal and since the first and/or the second peripheral unit as well as any further optional peripheral unit operates on a falling edge of their respective clock signals received from the clock generator, there can be provided a particularly robust communication and data exchange between the processing unit and each of the first and/or second peripheral units even without the global clock tree.

The predefined delay is typically chosen in such a way that for any combination of a processing unit with any of the available for peripheral units there will not arise any spikes in the timing diagram of clock signals provided by the clock generator and received by any of the processing unit and/or the peripheral units.

According to a further example there is provided a first logic circuit connected to the first peripheral clock output and connected to the first peripheral unit. The first logic circuit is operable to invert the first peripheral clock signal received from the clock generator and to transmit the inverted first peripheral clock signal to the first peripheral unit. The first logic circuit may be provided or implemented exclusively with such examples of the clock distribution network being void of a delay cell between the processor clock output and the processing unit. The first logic circuit and the signal inversion optionally provided by the first logic circuit may be beneficial to avoid or to suppress any spikes in a timing diagram of numerous clock signals generated by the clock generator and transmitted and/or received by the individual peripheral units or by the processing unit.

Typically, the first logic circuit is operable to invert the first peripheral clock signal only temporarily. Inversion of the first peripheral clock signal may be controlled and/or governed by a comparison of the processor clock signal with the first peripheral clock signal. Here and only with a predefined relation between the first peripheral clock signal and the processor clock signal the first logic circuit actually inverts the first peripheral clock signal. In other circumstances or with other conditions the first logic circuit may be operable to simply unalterably transmit the first peripheral clock signal received from the clock generator to the at least first peripheral unit.

According to a further example the first logic circuit is connected to the processor clock output and is further operable to invert the first peripheral clock signal and to transmit the inverted first peripheral clock signal to the first peripheral unit when the processor clock signal is smaller than the first peripheral clock signal received from the clock generator. This operation of the first logic circuit may help to avoid the generation of spikes in the timing diagram or in the clock signal received by the first peripheral unit.

According to a further example the first logic circuit comprises a multiplexer with a first multiplexer input, a second multiplexer input, a select line and a multiplexer output. The first multiplexer input is connected to the first peripheral clock output. The second multiplexer input is connected to the first peripheral clock output via an inverter. The multiplexer output is connected to the first peripheral unit and the select line is connected to a comparator. The comparator is operable to compare the processor clock signal with the first peripheral clock signal. Consequently, a first input of the comparator is typically connected to the processor clock output of the clock generator and a second input of the comparator is connected to the first peripheral clock output of the clock generator.

By way of the comparator a value of the respective signals, namely of the peripheral clock signal and of the processor clock signal can be mutually compared. Depending on the comparison and since the comparator is connected to the select line of the multiplexer one of the first and the second multiplexer inputs is transmitted to the multiplexer output. The multiplexer output is connected to an input of the first peripheral unit. In effect and since the first multiplexer input is connected to the first peripheral clock output of the clock generator and since the second input of the multiplexer is connected to the first peripheral clock output via an inverter, by way of comparing the first peripheral clock signal with a processor clock signal either the first peripheral clock signal or the inverted peripheral clock signal can be transmitted to the at least first peripheral clock output via the multiplexer.

The optional inversion of the first peripheral clock output for the respective first peripheral unit can be effectively used to avoid and/or to suppress any spikes or inadmissible peaks in the clock signal transmitted to or received by the at least first peripheral unit.

According to a further example of the clock distribution network there is provided a second logic circuit connected to the second peripheral clock output and connected to the second peripheral unit. The second logic circuit is operable to invert the second peripheral clock signal received from the clock generator and to transmit the inverted second peripheral clock signal to the second peripheral unit. In effect, the second logic circuit may be implemented in the same or like manner as the first logic circuit as described above. Insofar, all features, effects and benefits as described above in connection with the first logic circuit implemented between the clock generator and the at least first peripheral unit may equally apply to the second logic circuit and its interaction with the second peripheral clock output and the at least second peripheral unit, respectively.

In a further aspect the present disclosure also relates to a method of distributing a clock signal in a clock distribution network. With some examples the method of distributing a clock signal in a clock distribution network is implemented by a clock distribution network as described above. Insofar, all effects, features and benefits as described above in connection with the clock distribution network may equally apply to the method of distributing a clock signal in such a clock distribution network.

Irrespective of the specific implementation of the clock distribution network the method of distributing a clock signal in a clock distribution network may be executed by a clock distribution network comprising a clock generator, a processing unit and at least a first peripheral unit. Here, the clock generator comprises at least a processor clock output, a first peripheral clock output and a first clock request input. The processing unit is connected to the clock generator. It is typically connected to the processor clock output of the clock generator. The first peripheral unit is typically connected to the first peripheral clock output of the clock generator and is further connected to the first clock request input of the clock generator. The method of distributing a clock signal comprises the steps of generating a processor clock signal and transmitting the processor clock signal to the processing unit. The processing unit in turn is operated on a rising edge of the processor clock signal.

The method further comprises the step of generating and/or transmitting a first peripheral clock signal to the at least first peripheral unit via the first peripheral clock output in response to receive a first clock request signal from the first peripheral unit. Here, generation and/or transmission of the first peripheral clock signal is typically triggered by the at least first peripheral unit. Otherwise, generation and/or transmission of the first peripheral clock signal may be suppressed, e.g. per default. This way, energy and/or power consumption of the clock distribution network can be effectively reduced. Distributing the clock signal further comprises a step of operating the at least first peripheral unit on a falling edge of the peripheral clock signal.

The combination of the above-mentioned features and the method of distributing a clock signal allows to get rid of a global clock tree. Rather, the clock distribution network and the method of distributing a clock signal in a clock distribution network may be operated on a number of local clock trees, each being locally implemented and/or used for each peripheral unit and/or for the clock generator. Here, it is no longer required to establish a global clock tree interconnecting numerous peripheral units being and remaining permanently synchronized with respect to each other.

According to a further example the clock distribution network comprises at least a second peripheral unit connected to a second peripheral clock output and connected to a second clock request input of the clock generator. The first peripheral unit comprises a first local clock tree and the second peripheral unit comprises a second local clock tree. The first and the second local clock trees are operated independently from each other. Hence, the first local clock tree can be operated independent from the second local clock tree; and vice versa.

By waiving the requirement to synchronize first and second local clock trees, respective hardware components providing such synchronization become effectively superfluous. As a result, construction space for such supplemental hardware components, such as buffers or inverters usually required to mutually synchronize local clock trees of individual peripheral units can be saved.

According to a further example the method of distributing a clock signal further comprises the step of delaying the processor clock output received by the processing input by a predefined delay offset relative to the processor clock signal generated and transmitted by the clock generator. Such a delay is beneficial and is of particular use since the processor operates on a rising edge and since the first and/or the second or any further peripheral unit operates on a falling edge of the respective clock signal. With a time-delayed operation of the processing unit and with the first and/or second peripheral unit being operable to request generation and/or receipt of respective first and/or second peripheral clock signals, a data exchange between the processing unit and the peripheral unit is and remains rather robust.

According to a further example the method comprises the step of inverting the first peripheral clock signal received from the clock generator and transmitting the inverted first peripheral clock signal to the first peripheral unit when the processor clock signal is smaller than the first peripheral clock signal received from the clock generator. In this way, generation of inadmissible spikes in any of the first or second peripheral clock signals or in the processor clock signal can be effectively avoided.

In general, the above-described clock distribution network and the method of distributing a clock signal in a clock distribution network are applicable for a clock generator that simultaneously provides a number of different clock signals, i.e. a number of clock signals each of which oscillating with a predefined but different frequency.

BRIEF DESCRIPTION OF THE DRAWINGS

In the following, numerous examples of a clock distribution network are illustrated in greater detail by making reference to the drawings, in which.

DETAILED DESCRIPTION

Figure 1:
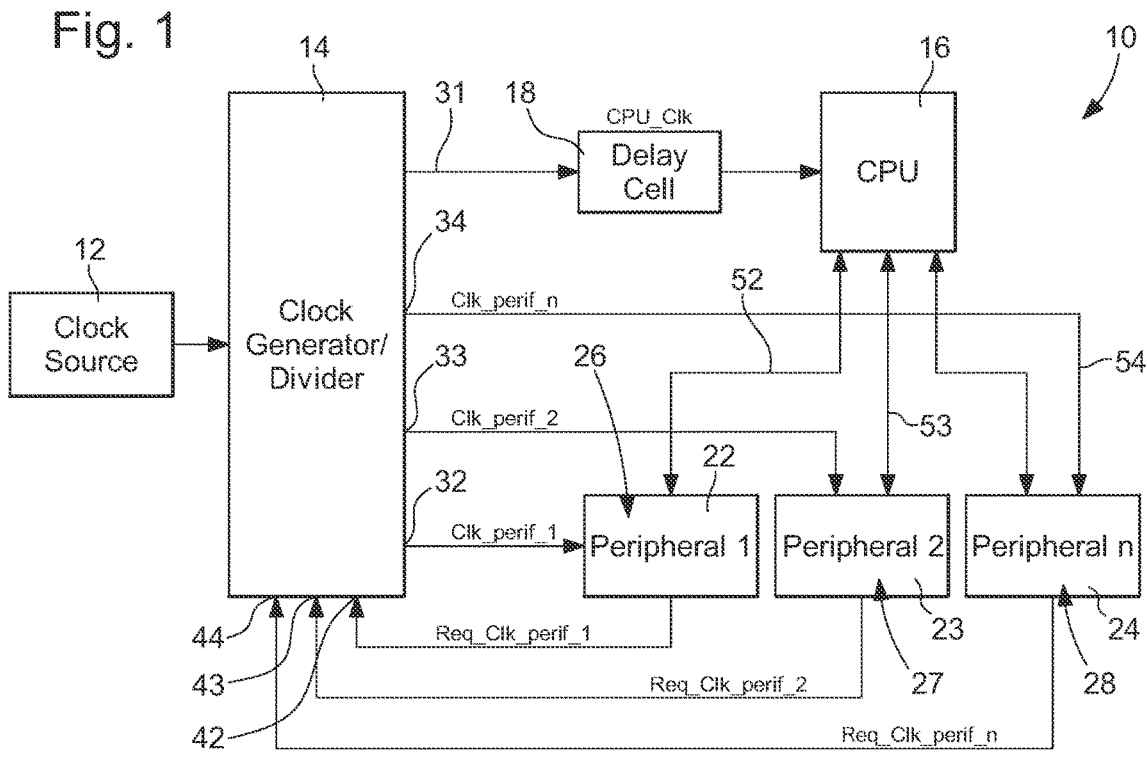
FIG. 1 schematically illustrates one example of a clock distribution network according to the present invention.

In FIG. 1 there illustrated a first example of a clock distribution network 10. The clock distribution network 10 comprises a clock source 12 providing a master clock signal. The clock source 12 is connected to a clock generator 14. The clock generator 14 derives and/or generates numerous individual clock signals from the signal obtained from the clock source 12. Typically, the clock generator 14 is operable to generate higher harmonics of the master clock signal and is operable to provide these individual clock signals e.g. as a first peripheral clock signal Clk_periph_1 at a first peripheral clock output 32, as a second peripheral clock signal Clk_periph_2 at a second peripheral clock output 33 and/or as a further peripheral clock signal Clk_periph_n at a further or n'th peripheral clock output 34, with n being an integer number larger than 2.

The clock distribution network 10 further comprises a processing unit 16 and numerous peripheral units 22, 23, 24. The peripheral unit 22 may be denoted as a first peripheral unit. The peripheral unit 23 may represent a second peripheral unit. The peripheral unit 24 may represent any further peripheral unit, e.g. and n'th peripheral unit, with n being an integer larger than 2.

As indicated in FIG. 1 each peripheral unit 22, 23, 24 is separately connected with the processing unit 16 via individual transmission lines 52, 53, 54. Hence, the first peripheral unit 22 may directly communicate with the processing unit 16 by the first transmission line 52. The second peripheral unit 23 may communicate with the processing unit 16 via a second transmission line 53 and the further peripheral unit 24 may communicate with the processing unit 16 via a further transmission line 54.

As further indicated in FIG. 1 the clock generator 14 comprises a processor clock output 31, which is connected with the processing unit 16. By way of the processor clock output 31, the processing unit 16 may be provided with a clock signal CPU_clk generated and/or distributed by the clock generator 14. The clock generator 14 further comprises the first peripheral clock output 32, the second peripheral clock output 33 and the further peripheral clock output 34.

The first peripheral clock output 32 is connected to the first peripheral unit 22. The second peripheral clock output 33 is connected to the second peripheral unit 23 and the further peripheral clock output 34 is connected to the further peripheral unit 24. Here, the first peripheral unit 22 may receive a first peripheral clock signal Clk_periph_1 via or from the first peripheral clock output whereas the second peripheral unit 23 is operable to receive a different second clock signal Clk_periph_2 from and/or via the second peripheral clock output 33.

The peripheral units 22, 23, 24 are further connected to numerous clock request inputs 42, 43, 44 of the clock generator 14. As indicated in FIG. 1 the first peripheral unit 22 is connected to the clock generator 14 via a first clock request input 42. The clock generator 14 further comprises the second clock request input 43 connected to the second peripheral unit 23. A further clock request input 44 of the clock generator 14 is connected to the further peripheral unit 24.

The first peripheral unit 22 is operable to generate and/or to transmit a first peripheral clock request signal Req_clk_perif_1 to the clock generator 14 via the first clock request input 42. The second peripheral unit 23 is operable to generate and/or to transmit a second peripheral clock request signal Req_clk_perif_2 to the clock generator 14 via the second clock request input 43 and the further peripheral unit 24 is operable to generate and/or to transmit a further peripheral clock request signal Req_clk_perif_n to the clock generator 14 via the further clock request input 44.

As further illustrated in FIG. 1 a clock input of the processing unit 16 is connected with an output of a delay cell 18 arranged between the processor clock output 31 and the processing unit 16. This way, a processor clock signal as provided and distributed by the clock generator via the processor clock output 31 is received in a delayed manner at the processing unit 16.

Operation of the clock distribution network 10 as illustrated in FIG. 1 is further illustrated by the timing diagrams according to FIGS. 3, 5, 7 and 9. As shown in the timing diagram of FIG. 3 the clock generator 14 is operable to generate numerous clock signals, e.g. clock signals CLK of 1 MHz, of 2 MHz, of 4 MHz, 8 MHz and of 16 MHz as illustrated in the upper five diagrams as illustrated on top of FIG. 3.

Figure 3:
FIG. 3 shows a timing a diagram of a first example of operating the clock distribution should network.

With the example of FIG. 3 the processing unit 16 is driven by a clock signal of 8 MHz which is provided as a signal S1 at the processor clock output 31. Since this signal is subject to a predefined delay there is generated a further delayed input signal S2 at the output of the delay cell 18, which signal Clk_CPU_8_MHz is then provided to the processor 16.

The first peripheral unit 22 is operating as a clock frequency of 1 MHz, which clock signal Clk_1_MHz is repeatedly reproduced as a signal S3 in the diagram of FIG. 3. The processing unit 22, which operates at a rising edge of the delayed processor clock signal S2 triggers a data exchange action with the first peripheral unit 22 at a time t1. At t1, the processing unit 16 generates and submits a start peripheral signal Start_perif via the first transmission line 52 to the first peripheral unit 22.

The first peripheral unit 22 in response generates a first peripheral clock request signal Req_Clock_Perif S5 and transmit this signal S5 to the first clock request input 42. Also at time t1 and in response to receive the peripheral clock request signal S5 from the first peripheral unit 22 the clock generator 14 starts to transmit or to gate a respective first peripheral clock signal Clk_Perif_1 MHz S6 at the time t1. As indicated in FIG. 3, the point of time t1 precedes a falling edge of the 1 MHz clock signal S6 to be used by the peripheral unit 22. Starting from time t2, hence after the falling edge of the 1 MHz clock signal there the first peripheral unit 22 receives a full period of a clock signal S6, which is then gated to the peripheral unit 22 from the internal clock signal S3.

Figure 5:
FIG. 5 shows a further timing diagram.

With the further example of FIG. 5 the processing unit 16 and one of the peripheral units 22, 23, 24 operate at a common frequency, hence, both, the processing unit 16 as well as e.g. the first peripheral unit 22 operate at a clock frequency of 8 MHz.

As described before in connection with FIG. 3 also with the timing diagram of FIG. 5, the clock generator 14 provides a processor clock signal S1, which is delayed by the delay cell 18 and which is provided as a delayed processor clock signal S2 at a clock input of the processing unit 16. The signal S3 is provided at the first peripheral clock output 32. Again and as described before in connection with FIG. 3 at a t1 the processing unit 16 transmits a start peripheral signal Start_Perif S4 and transmits the same to the first peripheral unit 22 by the transmission line 52.

In response, the first peripheral unit 22 generates and transmits a respective peripheral clock request signal S5 to the first clock request input 42 thereby initiating the gating or transmission of the first peripheral clock signal via the first peripheral clock output 32 as signal S6. Here and since the time t1 is delayed compared to a rising edge of the signal S3 generation of a spike at any time t1 or t2 can be effectively avoided. The start of the transmission of the first peripheral clock signal at t2 is delayed compared to the rising edges of the signals S4 or S5.

Figure 7:
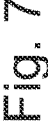
FIG. 7 shows a further timing diagram.

With the further example of the clock distribution network of FIG. 1 as illustrated in FIG. 7 the processing unit 16 is again operating at a delayed clock signal Clk_CPU_8_MHz S2 of 8 MHz, whereas the respective peripheral unit 22 is operating at a peripheral clock signal Clk_Perif_16_MHz S6 of 16 MHz.

Again and as illustrated in the timing diagram of FIG. 7 a clock signal S2 driving the processing unit 16 is delayed compared to the original 8 MHz clock signal S1 as provided at the processor output 31 of the clock generator 14. The signal S3 just reflects the internal 16 MHz clock signal as generated or provided by the clock generator 14 and which has to be gated to the respective peripheral unit 22.

Again and when the processing unit 16 starts to communicate with the peripheral unit 22 there is generated a start peripheral signal S4, which is directly transmitted via the transmission line 52 to the respective peripheral unit 22. In response, the peripheral unit 22 generates a peripheral clock request signal S5. Due to the time delay of the signal S2 generation of the signals S4 and S5 is delayed as well and the first peripheral clock output 32 only becomes active at time t2. Gating or transmission of the 16 MHz internal clock signal S3 from the clock generator 14 to the respective peripheral unit 22 is then active for a number of periods of the first peripheral clock signal S6, preferably 16 periods.

Figure 9:
FIG. 9 shows a further timing diagram.

With the further timing diagram of FIG. 9 the processing unit is operating at a frequency of 1 MHz whereas the peripheral unit 22 is operating at a clock frequency of 8 MHz. Again and in the same manner as described above in connection with FIG. 3, 5 or 7 the processor clock signal S1 as provided at the processor clock output 31 is time delayed by a predefined offset and is provided as a time delayed processor clock signal S2 to the processing unit 16.

With the rising edge of the time-delayed processor clock signal S2 the start peripheral signal Start_Perif S4 and the peripheral clock request signal Req_Clock_Perif S5 are generated. By receiving the signal S5 at a time t2 the clock generator 14 gates the signal S3 as the first peripheral clock signal Clk_Perif_8_MHz S6 to the first peripheral clock output 32 and transmit the respective internally generated clock signal S6 to the first peripheral unit 22.

Figure 2:
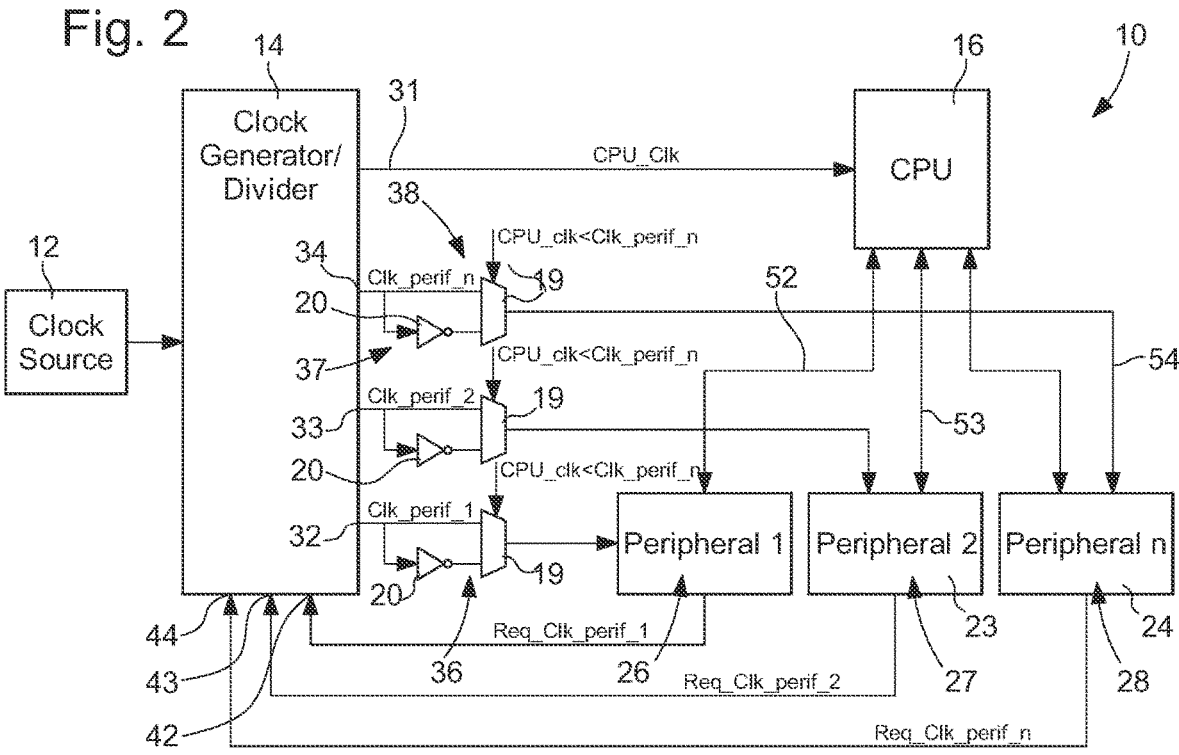
FIG. 2 shows a further example of a clock distribution network.

With a further example of the clock distribution network 10 as shown in FIG. 2 the processing unit 16 is directly connected to the clock generator 14 without a delay cell 18 therebetween. Rather and with the example of FIG. 2 instead of a delay cell 18 there are provided individual logic circuits 36, 37 and 38 between the peripheral units 22, 23, 24 and the associated peripheral clock outputs 32, 33, 34. Hence, the first peripheral unit 22 is connected to the first peripheral clock output 32 via the first logic circuit 36. The second peripheral unit 23 is connected to the second peripheral clock output 33 via a second logic circuit 37. The further peripheral unit 24 is connected to the further peripheral clock output 34 of the clock generator 14 via a third logic circuit 38.

Each logic circuit 36, 37, 38 comprises a multiplexer 19 with a first multiplexer input directly connected to the respective first, second or further peripheral clock output 32, 33, 34. The multiplexer 19 is further provided with a second multiplexer input, which is connected via an inverter 20 with the respective peripheral clock output 32, 33, 34.

Each multiplexer 19 of the numerous logic circuit 36, 37, 38 is further provided with a select line. The select line is connected with and/or driven by a comparator (not illustrated). Typically, the comparator is operable to compare the processor clock signal as provided e.g. on the processor clock output 31 with the respective peripheral clock signal as provided at the respective first, second or further peripheral clock output 32, 33, 34.

The logic circuit 36, 37, 38 is operable to transmit the respective peripheral clock signal directly and unalterably to the respective peripheral unit 22, 23, 24 in case that the value of the processor clock signal is larger than the value of the respective first, second or third peripheral clock signal, respectively. In any other situation, i.e. when the processor clock signal is smaller than the first, second or third peripheral clock signal the multiplexer 19 switches to the inverted signal as provided by the inverter 20. In effect and in such conditions the respective peripheral unit 22, 23, 24 is provided with the inverted peripheral clock signal.

Operation of the example of the clock distribution network as illustrated in FIG. 2 is now described in more detail with regards to the timing diagrams as shown in FIG. 4, 6, 8 or 10.

Figure 4:
FIG. 4 shows a further timing diagram of the clock distribution network.

In the timing diagram of FIG. 4, the processing unit 16 is operated at a clock frequency of 8 MHz and the first peripheral unit 22 is operated at a clock frequency of 1 MHz. Here and since the clock input of the processing unit 16 is directly connected to the processor clock output 31, the respective clock signals S1 and S2 are substantially identical. Signal S3 is just a reproduction of the internally generated 1 MHz clock signal Clk_1_MHz as provided by the clock generator 14.

At a time t1 the processing unit 16 transmits a start peripheral signal Start_Perif S4 via the transmission line 52 to the first peripheral unit 22. In response to receive the signal S4 the first peripheral unit 22 generates a respective peripheral clock request signal S5 and submits this signal via the first peripheral clock input 42 to the clock generator 14. In response to receive the signal Req_Clock_Perif S5 the clock generator 14 starts to operate and gates the signal S3 as the peripheral clock signal Clk_Perif_1_MHz S6 to the first peripheral unit 22 via the first peripheral clock output 32. At the time t2, the first peripheral unit 22 receives a full period of the first peripheral clock signal S6.

Figure 6:
FIG. 6 shows a further timing diagram.

A similar situation and behavior is illustrated with the timing diagram of FIG. 6. Here and as already described above in connection with FIG. 5 the first peripheral unit 22 as well as the processing unit 16 both operate at a common clock frequency of 8 MHz. The start peripheral signal S4 and the request clock peripheral signal S5 are generated at a time t1, which leads to the generation and transmission of a period of the first peripheral clock signal S6 starting from the point of time t2.

With both examples of FIGS. 4 and 6 and at the time t1 the processor clock signal S2 is larger or equal than the clock signal S3 intended for the peripheral unit 22. Therefore, the signal S3 is not inverted by the logic circuit 36, 37 or 38 but is gates to the respective peripheral unit rather unaltered.

Figure 8:
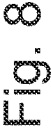
FIG. 8 shows a further timing diagram.

With the timing diagram as illustrated in FIG. 8 the situation changes. There, the processing unit 16 is driven at a clock frequency of 8 MHz and the processing unit 16 is provided with the clock signal S2. The first peripheral unit 22 is to be driven at a peripheral clock frequency of 16 MHz. Here and at the time t1 the logic value of the processor clock signal S2 is larger than the value of the dedicated peripheral clock signal S3. At t1 the rising edge of the processor clock signal S2 coincides with the falling edge of the first peripheral clock signal S3. Here, the first logic circuit 36 is operable to invert the first peripheral clock signal S3 and generates an inverted first peripheral clock signal S3'.

This inverted first peripheral clock signal S3' is then transmitted to the first peripheral unit 22 to initiate requesting a peripheral clock signal generation at the time t1 by generating the respective signals S4 and S5 as described before. Starting from time t2 the clock generator 14 provides a number of periods of the inverted clock signal S3' at the first peripheral clock output 32 to drive or to clock one of the peripheral units 22, 23, 24. Preferably, starting from time t2, the clock generator 14 provides 16 periods of the inverted clock signal S3'

Figure 10:
FIG. 10 shows another timing diagram of the clock distribution network.

In the further timing diagram of FIG. 10 a similar inversion as described above in connection with FIG. 8 is described in greater detail. Here and as described before with regard to the timing diagram of FIG. 9 the processing unit 16 is driven at a clock frequency of 1 MHz whereas the peripheral unit 22 is driven at a clock frequency of 8 MHz.

Also here and at a time t1 the processor clock signal S1 or S2 is larger than the peripheral clock signal S3. As a consequence, the logic circuit 36 inverts the peripheral clock signal S3 into an inverted peripheral clock signal S3' in order to clock or to drive the respective peripheral unit 22, 23, 24. At time t2 and induced by the generation and transmission of the signals S4 and S5 the respective peripheral unit 22, 23, 24 obtains and receives the inverted first peripheral clock signal S3', which is gated through as a peripheral clock signal S6 to a dedicated peripheral unit 22, 23, 24.

The above-mentioned timing diagrams of FIGS. 3-10 are only illustrative of a limited amount of peripheral units 22, 23, 24. Most of the timing diagrams have been described with regard or with reference to the first peripheral unit 22. However, other peripheral units like the second peripheral unit 23 and any further peripheral unit 24 can be driven concurrently with different clock signals as described above.

For instance, the first peripheral unit 22 may be driven by a 1 MHz clock signal. The second peripheral unit 23 may be driven by a 4 MHz clock signal and the further peripheral unit 24 may be driven by a clock signal of 16 MHz.

Moreover, each one of the peripheral units 22, 23, 24 may be operated at a local clock tree or may comprise a local clock tree 26, 27, 28, in detail, the peripheral unit 22 may be provided with a first local clock tree 26. The second peripheral unit 23 may be provided with a second local clock tree 27 and the further peripheral unit 24 may be provided with a further clock tree 28. The individual clock trees 26, 27, 28 may operate independently from each other and do not have to be mutually synchronized or locked to a global clock tree.

Figure 11:
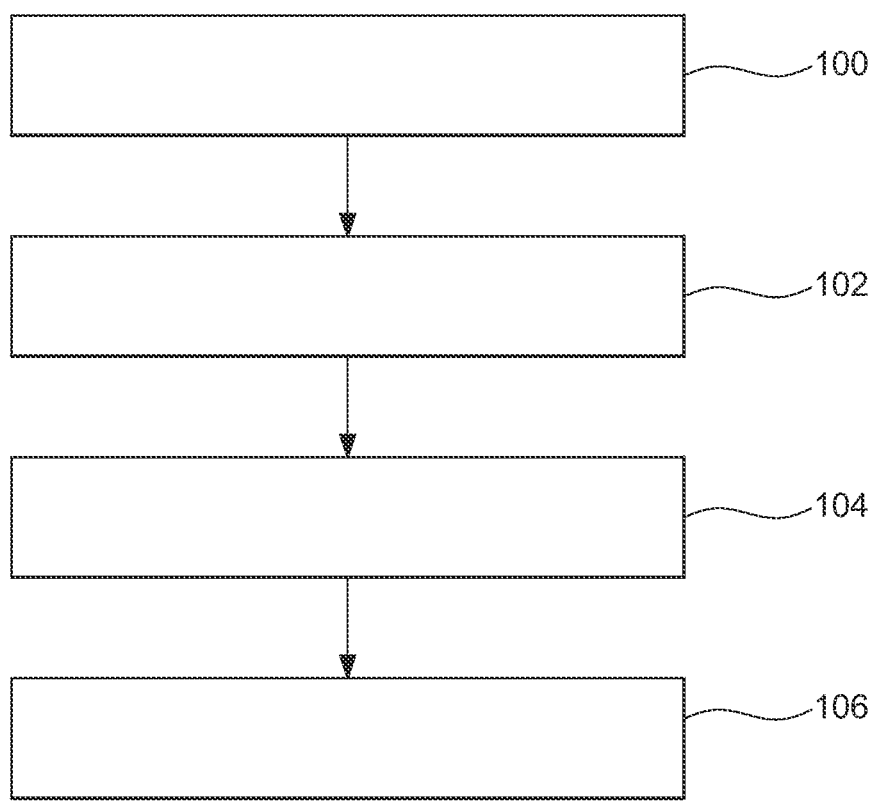
FIG. 11 is illustrative of a flowchart of the method of distributing a clock signal in a clock distribution network.

In the flowchart according to FIG. 11 the method of distributing a clock signal in a clock distribution network 10 as provided above is schematically illustrated. Here, in step 100 there is generated a processor clock signal, which is then transmitted to the processing unit 16. In step 102 the processing unit 16 is operated on a rising edge of the processor clock signal. In step 104 the first peripheral clock signal is generated and/or transmitted to at least one of the above described first, second or any further peripheral units 22, 23, 24, and in a subsequent step 106 the respective peripheral unit 22, 23 or 24 is then driven or operated on a falling edge of the respective peripheral clock signal.

REFERENCE NUMBERS 10 clock distribution network
12 clock source
14 clock generator
16 processing unit
18 delay cell
19 multiplexer
20 inverter
22 peripheral unit
23 peripheral unit
24 peripheral unit
26 clock tree 27 clock tree
28 clock tree
31 clock output
32 clock output
33 clock output
34 clock output
36 logic circuit
37 logic circuit
38 logic circuit
42 clock request input
43 clock request input
44 clock request input
52 transmission line
53 transmission line
54 transmission line

The invention claimed is:

1. A clock distribution network, comprising:
a clock generator configured to generate at least a processor clock signal and at least a first peripheral clock signal, the clock generator further comprises at least a processor clock output, a first peripheral clock output and a first clock request input,
a processing unit connected to the processor clock output and to a first transmission line, wherein the processing unit is configured to operate on a rising edge of the processor clock signal receivable via the processor clock output to generate and transmit a start peripheral signal via the first transmission line,
at least a delay cell connected to the processor clock output and operable to delay the processor clock signal received by the processing unit by a predefined delay offset relative to the processor clock signal and peripheral clock signal generated and transmitted by the clock generator,
at least a first peripheral unit connected to the first peripheral clock output, connected to the first clock request input of the clock generator, and connected to the processing unit via the first transmission line, wherein the at least first peripheral unit is configured to operate on a falling edge of the first peripheral clock signal received via the first peripheral clock output, wherein, in response to receiving the start peripheral signal via the first transmission line, the at least first peripheral unit via the first clock request input is operable to trigger the clock generator to transmit the first peripheral clock signal via the first peripheral clock output.

2. The clock distribution network according to claim 1, wherein the at least a delay cell is operable to delay the processor clock output received by the processing unit by a predefined delay offset relative to the processor clock signal generated and transmitted by the clock generator.

3. The clock distribution network according to claim 1, wherein the clock generator is configured to suppress a transmission of the first peripheral clock signal unless requested from the at least first peripheral unit via the first clock request input.

4. The clock distribution network according to claim 1, wherein the processing unit is directly connected to the at least first peripheral unit via the first transmission line.

5. The clock distribution network according to claim 1, further comprising at least a second peripheral unit connected to a second peripheral clock output and connected to a second clock request input of the clock generator, wherein the at least second peripheral unit via the second clock request input is operable to trigger the clock generator to transmit a second peripheral clock signal via the second peripheral clock output.

6. The clock distribution network according to claim 5, wherein the processing unit is directly connected to the at least second peripheral unit via a second transmission line.

7. The clock distribution network according to claim 5, wherein the first peripheral unit comprises a first local clock tree, wherein the second peripheral unit comprises a second local clock tree and wherein the first local clock tree operates independently from the second local clock tree and/or wherein the second local clock tree operates independently from the first local clock tree.

8. A method of distributing a clock signal in a clock distribution network comprising:
a clock generator with at least a processor clock output, a first peripheral clock output and a first clock request input,
a processing unit connected to the clock generator and to a first transmission line,
at least a delay cell connected to the processor clock output and operable to delay the processor clock signal received by the processing unit by a predefined delay offset relative to the processor clock signal generated and transmitted by the clock generator, and
at least a first peripheral unit connected to the first peripheral clock output, connected to the first clock request input of the clock generator, and connected to the processing unit via the first transmission line, the method of distributing a clock signal comprises:
generating a processor clock signal and transmitting the processor clock signal to the processing unit,
operating the processing unit on a rising edge of the processor clock signal to generate and transmit a start peripheral signal via the first transmission line,
providing, by the clock generator, a number of periods of an inverted clock signal, which is inverted with respect to a first peripheral clock signal, at the first peripheral clock output to drive or to clock one of the peripheral units,
in response to receiving the start peripheral signal via the first transmission line, operating the at least first peripheral unit to trigger the clock generator to transmit the first peripheral clock signal via the first peripheral clock output,
generating and/or transmitting the first peripheral clock signal to the at least first peripheral unit via the first peripheral clock output in response to receiving a first clock request signal from the first peripheral unit and
operating the at least first peripheral unit on a falling edge of the first peripheral clock signal.

9. The method according to claim 8, wherein the clock distribution network comprises at least a second peripheral unit connected to a second peripheral clock output and connected to a second clock request input of the clock generator, wherein the first peripheral unit comprises a first local clock tree and wherein the second peripheral unit comprises a second local clock tree and wherein the first and the second local clock trees are operated independent from each other.

10. The method according to claim 8, further comprising delaying the processor clock output received by the processing unit by a predefined delay offset relative to the processor clock signal generated and transmitted by the clock generator.

* * * * *